Figure 1:
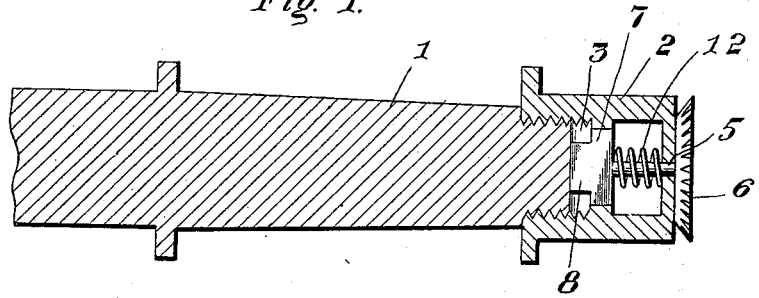

No. 607,163. Patented July 12, 1898.
C. A. DETWILER.
NUT LOCK.
(Application filed Oct. 19, 1897.)

(No Model.)

Witnesses
Chas. P. Heinemann.
Victor J. Evans.

Inventor
Clinton A. Detwiler.
V. D. Stockbridge.
Attorney

UNITED STATES PATENT OFFICE.

CLINTON A. DETWILER, OF PALMYRA, PENNSYLVANIA, ASSIGNOR OF ONE-TENTH TO ABRAHAM G. STAUFFER.

NUT-LOCK.

SPECIFICATION forming part of Letters Patent No. 607,163, dated July 12, 1898.

Application filed October 19, 1897. Serial No. 655,668. (No model.)

*To all whom it may concern:*

Be it known that I, CLINTON A. DETWILER, a citizen of the United States, residing at Palmyra, in the county of Lebanon and State of Pennsylvania, have invented certain new and useful Improvements in Nut-Locks; and I do hereby declare the following to be a full, clear, and exact description of the invention, such as will enable others skilled in the art to which it appertains to make and use the same.

This invention relates to nut-locks, the object in view being to provide a simple, convenient, and ornamental nut having combined therewith a lock designed to engage the nut and bolt or spindle to which the nut is applied, so as to securely hold the nut in place thereon and prevent loosening or rattling of the same.

The detailed objects and advantages of the invention will be pointed out in the course of the subjoined description.

The invention consists in a nut-lock embodying certain novel features and details of construction, as hereinafter fully described, illustrated in the drawings, and incorporated in the claims.

Figure 2:
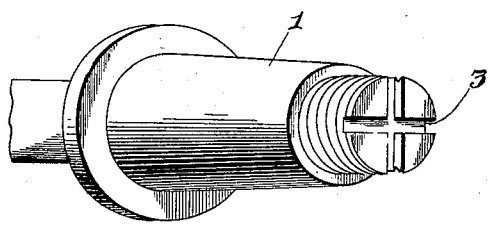
Figure 3:
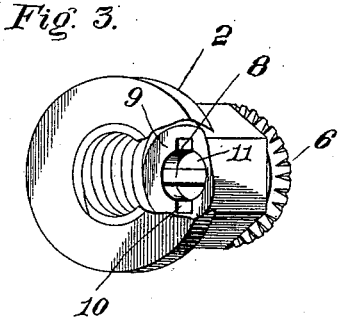
Figure 5:
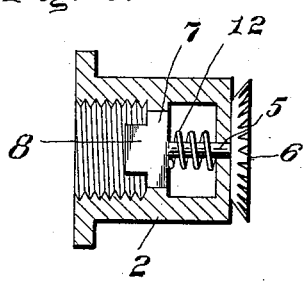
Figure 6:
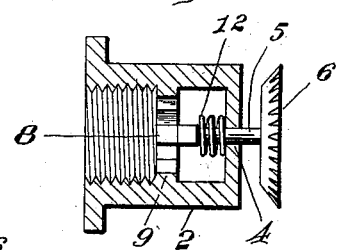
Figure 4:
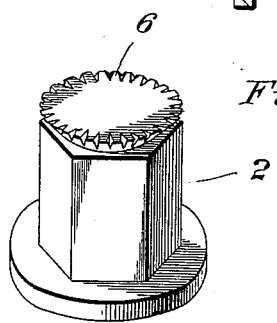

In the accompanying drawings, Figure 1 is a longitudinal section through the nut and bolt or spindle, showing the improved locking feature. Fig. 2 is a detail perspective view of the end of the bolt or spindle. Fig. 3 is a similar view, looking toward the inner face of the nut. Fig. 4 is a detail perspective view of the nut *per se*. Figs. 5 and 6 are detail sections through the nut, showing the lock in its forward and backward positions.

Similar numerals of reference designate corresponding parts in all the views.

Referring to the drawings, 1 designates the bolt or spindle, provided adjacent to its end with screw-threads to receive the nut, (indicated at 2.) For the purpose of carrying out this invention the end of the bolt or spindle is provided with a diametrical groove or kerf 3, designed to be engaged by the lock.

The nut 2 is closed at its outer end, except for a small central opening 4, through which passes the stem 5 of the lock. The inner end of the stem is provided with a milled head 6, which lies outside of the nut and abuts against the outer surface or end thereof. Upon the inner end of the stem is a cross-head 7 of oblong form and projecting radially from both sides of the stem. Extending beyond the inside of the inner edge of the cross-head is an oblong lug or key 8, which is designed to enter the groove or kerf in the end of the bolt or spindle.

Arranged within the nut is a web 9, having a diametrical slot 10, for the purpose of receiving the cross-head of the lock, and the central portion of the slot 10 is provided with a circular enlargement 11 to admit of the rotation of the key 8 when the cross-head has been drawn outward toward the outer end of the nut in order to engage the said cross-head behind the web 9. Interposed between the cross-head 7 and the end of the nut is a spiral spring 12, coiled around the stem 5 of the lock and serving to normally force the lock inward into engagement with the bolt or spindle.

In applying the nut to the bolt or spindle the milled head 6 is first drawn outward and then given a partial turn, which causes the cross-head 7 to engage behind the web 9. While in this position, the nut is tightened by means of a wrench in the ordinary manner. Just before the nut is finally tightened the head 6 is turned so as to allow the cross-head 7 to be forced by the spring into the slot 10. The key 8 now comes in contact with the end of the bolt or spindle, whereupon by slightly turning the nut the key 8 springs into the diametrical groove or kerf 3. In removing the nut the operation above described is simply reversed.

Instead of providing a single diametrical groove or kerf 3 it is desirable in many instances to provide two or more of such kerfs, thus giving a greater range of adjustment to the lock and enabling the nut to be held at each quarter of a revolution or less, if desired.

It will be apparent that while I have produced a simple and efficient nut-lock the locking feature adds but little to the expense of the nut and gives an ornamental finish thereto, which is especially desirable in carriages, wagons, or other vehicles.

Having thus described the invention, what is claimed as new, and desired to be secured by Letters Patent, is—

1. In a nut-lock, in combination, a nut closed at its outer end with the exception of a small central opening, a web within the nut having a diametrical slot, the central portion of which is enlarged in circular form, a stem slidingly fitted in the opening in the end of the nut and carrying a head arranged exteriorly of the nut, a cross-head on the inner end of said stem adapted to slide into and out of the slot in the web and to be engaged behind the web, a spring coiled around said stem for giving the cross-head a normal inward tendency, and a key or lug extending inward beyond the face of the cross-head, substantially as described.

2. In a device of the character described, the combination with a spindle, provided with a reduced screw-threaded extremity having a pair of diametrically-extending kerfs in its outer face, disposed at right angles, of a nut having a closed end and a diametrical web intermediate of its ends, and screw-threaded between said web and the open end, whereby said nut may be screwed upon the reduced extremity of the spindle, a stem extending through the closed end of the nut and provided upon its outer extremity with a head, and upon its inner extremity with a cross-head, provided with a comparatively small lug, said web being provided with a circular opening of a diameter corresponding with the length of the lug, and with diametrical slots or recesses for the accommodation of the cross-head, and a spring intermediate of the cross-head and the closed end of the nut, substantially as specified.

In testimony whereof I affix my signature in presence of two witnesses.

CLINTON A. DETWILER.

Witnesses:
C. P. EABY,
MILTON C. KLINE.